N. H. LINDLEY.
WELL BORING APPARATUS.
No. 109,028.  Patented Nov. 8, 1870.
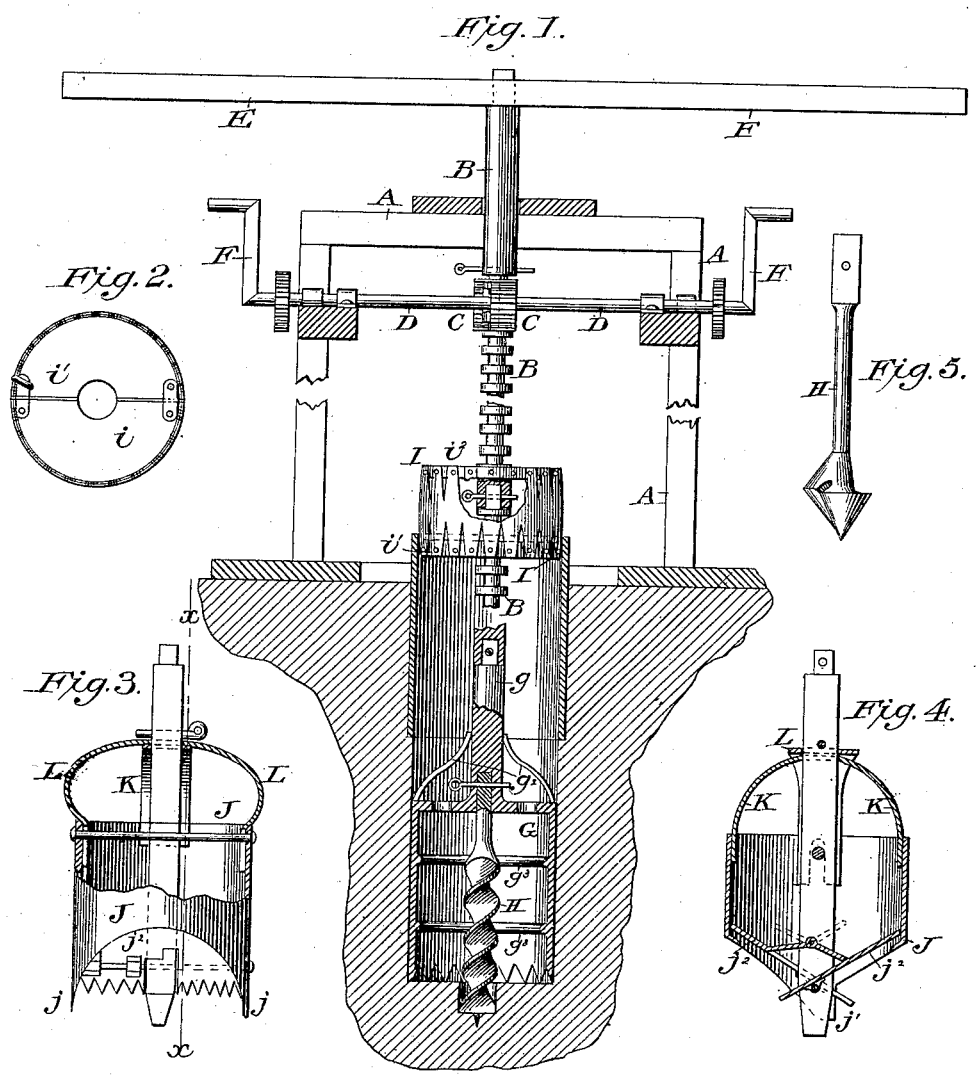

United States Patent Office.

NOAH H. LINDLEY, OF BRIDGEPORT, CONNECTICUT.

Letters Patent No. 109,028, dated November 8, 1870.

IMPROVEMENT IN WELL-BORING APPARATUS.

The Schedule referred to in these Letters Patent and making part of the same

*To all whom it may concern:*

Be it known that I, NOAH H. LINDLEY, of Bridgeport, in the county of Fairfield and State of Connecticut, have invented a new and useful Improvement in Well-boring Apparatus; and I do hereby declare that the following is a full, clear, and exact description thereof, which will enable others skilled in the art to make and use the same, reference being had to the accompanying drawing forming part of this specification.

Figure 1 is a detail sectional view of my improved apparatus.

Figure 2 is a top view of the guide and brace for the coupled shaft.

Figure 3 is a side view of the boring-tool for enlarging the well-bore below the curbing, part being broken away to show the construction.

Figure 4 is a detail sectional view of the same, taken through the line $xx$, fig. 3.

Figure 5 is a detail side view of one form of tool for supporting the dirt in the boring-tool while being raised from the well.

Similar letters of reference indicate corresponding parts.

My invention has for its object to furnish an improved apparatus for boring or digging wells, which shall be simple in construction and effective in operation, cutting out and raising the dirt with dispatch, while, at the same time, leaving the inner surface of the bore or cut straight and smooth; and It consists in the construction and combination of the various parts of the apparatus as hereinafter more fully described.

A represents a frame-work erected over the place where the well is to be dug, to support the operating mechanism.

B is the shaft or rod by means of which the digging-tools are operated, and which is made in sections of convenient length.

The sections have a tenon formed upon one end and a socket in the other, for convenience in coupling them together, and are held in place, when coupled, by transverse pins, as shown in fig. 1.

The shaft B has a rack formed upon two of its opposite sides to receive the teeth of the two gear-wheels C, which are attached to the two shafts D.

The two shafts D cross the frame A upon the opposite sides of the shaft or bar B, and revolve in bearings attached to said frame in such a way that the shafts D may be moved longitudinally to throw the said wheels C out of and into gear with the shaft B when desired. The shaft B, when out of gear with the gear-wheels C, is revolved to force the boring or digging-tool into the ground by a sweep E, attached to the upper end of the upper length or section of the shaft B, as shown in fig. 1.

The shafts D are revolved, to raise and lower the jointed shaft B and its attachments, by means of cranks, F, attached to their ends, as shown in fig. 1.

G is the boring or digging-tool, which is made open at its lower end, and to its upper end is attached, or upon it is formed, a shank, $g^1$, which is connected to the lower end of the lowest length or section of the shaft B, in the same manner as the sections of said shaft are connected with each other.

The connection between the shank $g^1$ and the body of the boring-tool G, is strengthened by the brace $g^2$, shown in fig. 1.

The upper end of the boring-tool G has several holes formed in it, to allow the air in the cylinder G to escape as said cylinder is forced into the ground. The lower edge of the cylinder G is serrated, to enable it to be forced into the ground more readily.

Upon the inner surface of the cylinder G is formed one or more rings or flanges, $g^3$, to increase the friction between said inner surfaces and the contents of the said cylinder, to assist in retaining said contents in place while being raised out of the well.

To the lower end of the shank $g^1$ of the borer G is secured the upper end of the boring-tool H, by means of a tenon, socket, and pin, to support the middle part of the contents of said cylinder while being raised from the well.

The tool H may be made with a spiral groove, twist, or thread, as shown in fig. 1, or with an enlarged head or lower end, as shown in fig. 5, or in any other suitable form, the form being immaterial so long as it is such as to offer some slight support to the middle part of the contents of the said cylinder. In some soils the central tool H will not be required.

When the entire length of the tool G has passed into the ground, and it is desired to raise it with its contents, the earth is packed therein by a blow on the shaft B, by the gearing, or by compression applied in any other manner.

The joints of the shaft B are strengthened, and the said shaft kept in a vertical position and in the center of the well, by the guard I.

The guard I is formed by attaching the edges of a metal plate, $i^1$, to the edges of two circular ends or heads $i^2$.

The edges of the plate $i^1$ are deeply notched, as shown in fig. 1, so that by contracting the said edges slightly the middle part of the plate may be made to bulge, as shown in fig. 1.

The guard I is made in two parts, as shown in fig. 2, which parts are hinged to each other at one edge, and detachably secured at the other edge by a hasp and rod, or in any other convenient detachable manner.

By this construction, as the shaft B descends into the well the guard I is carried down with it, and the bulging middle part of its sides rest against the inner surface of the cut and thus keeps the said shaft in a vertical position. The bulging sides of the guard I, coming in contact with the surface of the cut, tends to smooth said surface rather than dig it out, as a guard of another form would do.

In digging through water, or through strata that cannot be raised by the tool G, the tool J is used, the body of which is cylindrical in form, and has two or more cutters or points, $j^1$, projecting from its lower edge, which separate the soil to be raised from the wall of the well.

The bottom $j^2$ of the tool J is made in two parts, semicircular in their general form, and set at an inclination with each other, as shown in fig. 4.

The half of each straight edge upon the opposite side of the central shaft of the tool J projects beyond the other part, and is serrated, to enable it to take a better hold upon the ground. The other edges are turned up slightly and have flaps hinged to them, as shown in figs. 3 and 4, so that when the tool is raised the said flaps may close down and prevent the material in said tool from escaping.

The straight edges of the parts of the bottom of the tool J are supported by a rod passing through the lower part of the shaft or stem of the said tool, and its curved edges are supported by strips or flanges attached to or formed upon the inner surface of the lower part of the cylindrical case of said tool.

K is a brace or bail, the ends of which are secured to the upper part of the cylindrical case of the tool J, and through a hole in the middle part of which the shaft or stem of the said tool passes.

L is another bail, through a hole in the middle of which the said shaft passes.

The ends of the bail L are slotted to receive a cross-rod attached to the upper part of the case or cylinder of the tool J, as shown in figs. 3 and 4. The bail L is curved, as shown in fig. 3, so as to project beyond the cylinder. The bail L is designed for use to excavate the sides of the well beneath the lower end of the curbing, so that the said curbing may be forced down as the digging progresses.

The dirt dug out by the bail L falls into the cylinder of the tool J at the same time that the said cylinder is receiving dirt from its lower end.

When the tool J is drawn up the bail K is forced inward by the lower edge of the curbing, and the tool passes up freely.

Having thus described my invention,

I claim as new and desire to secure by Letters Patent—

1. The boring-tool G, made in the form of a hollow cylinder open at its lower end, having its upper end perforated, its lower edge serrated, and having one or more circular ribs or flanges attached to or formed upon its inner surface, substantially as herein shown and described, and for the purpose set forth.

2. The combination of the elastic projecting and self-adjusting bail L, with the cylindrical boring-tool J, provided with a bottom and boring-lips, substantially as herein shown and described, and for the purpose set forth.

NOAH H. LINDLEY.

Witnesses:
C. M. MINOR,
L. M. SLADE.